No. 680,177. Patented Aug. 6, 1901.
H. ROSSKOPF.
BICYCLE STAND.
(Application filed June 23, 1900.)
(No Model.) 2 Sheets—Sheet 2.
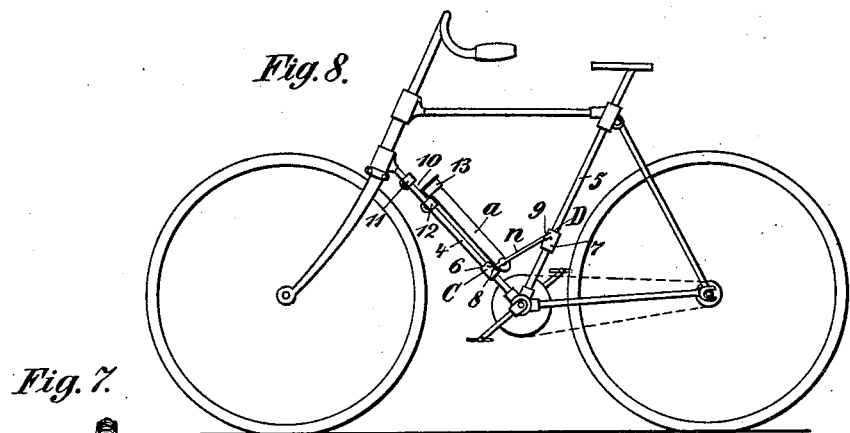
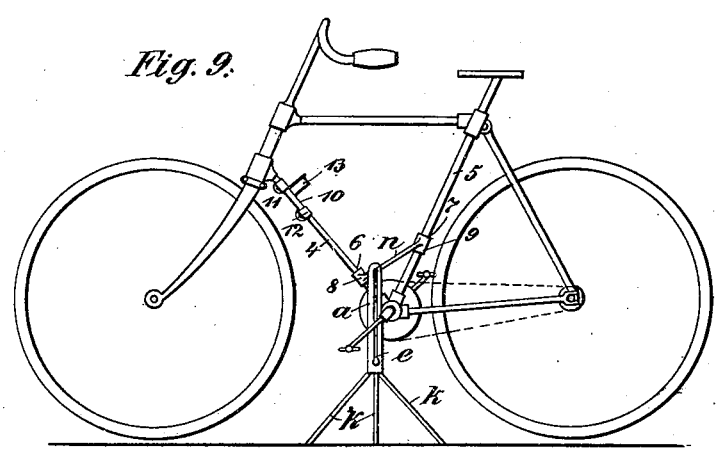
Witnesses:
James R. Mansfield
W. Cleary Sullivan
Inventor.
Heinrich Rosskopf.
By Alexander Bowell
Attorneys.

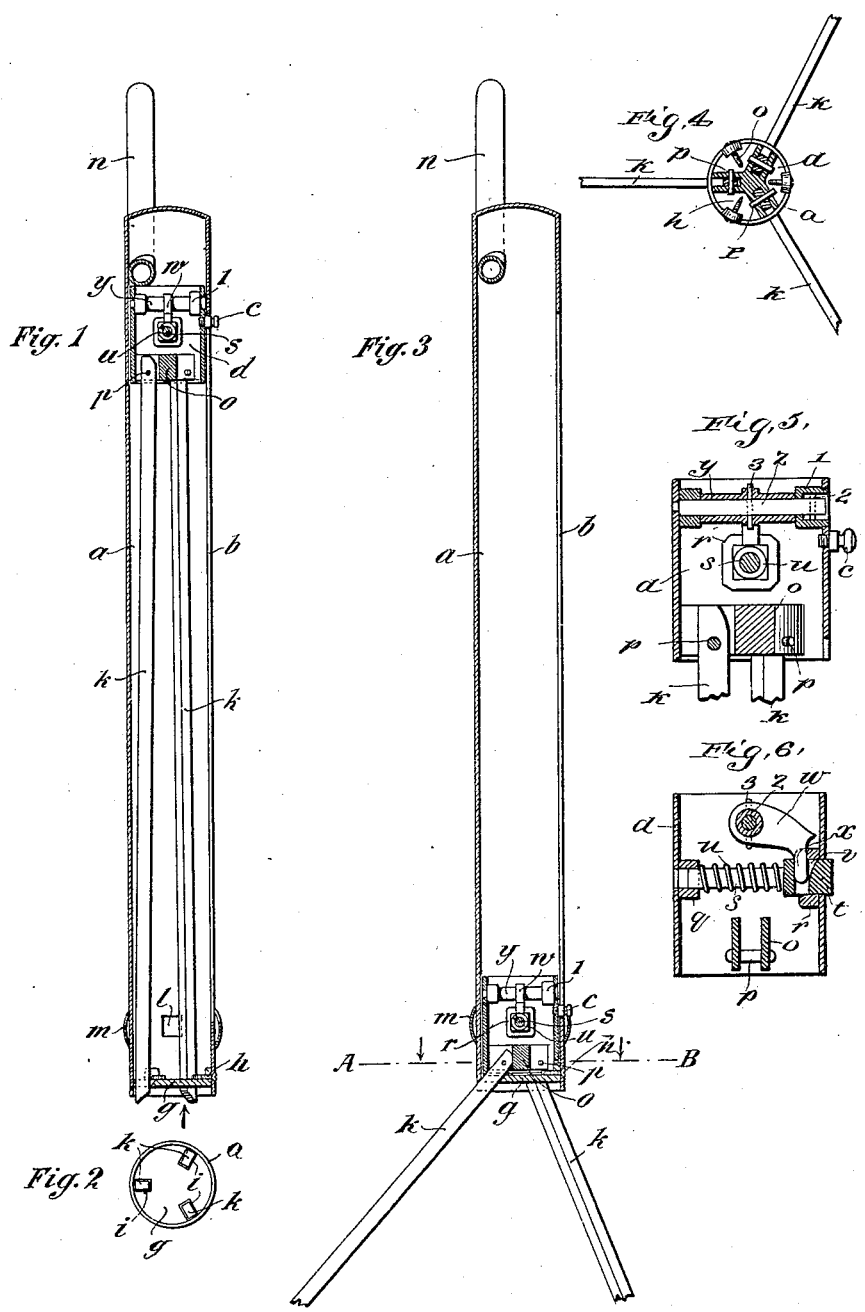

UNITED STATES PATENT OFFICE.

HEINRICH ROSSKOPF, OF STEGLITZ, GERMANY.

BICYCLE-STAND.

SPECIFICATION forming part of Letters Patent No. 680,177, dated August 6, 1901.

Application filed June 23, 1900. Serial No. 21,354. (No model.)

*To all whom it may concern:*

Be it known that I, HEINRICH ROSSKOPF, watchmaker, a subject of the King of Prussia, German Emperor, residing at Steglitz, near Berlin, in the Kingdom of Prussia and Empire of Germany, have invented new and useful Improvements in and Connected with Bicycle-Stands, of which the following is a full, clear, and exact description.

This invention is an improved support or stand for bicycles adapted to be attached to the frame of the machine and to be folded up when not in use. It can be readily unfolded so as to support the machine whenever desired, and when unfolded it will be automatically locked and prevent use of the wheel until it is again unlocked and folded.

The invention consists in the novel construction and combination of parts illustrated in the drawings and hereinafter described and claimed.

In said drawings, Figure 1 is a view of the support detached and folded, the outer casing being in section to show the interior parts. Fig. 2 is an end view of Fig. 1. Fig. 3 is a similar view of Fig. 1, showing the parts extended or unfolded. Fig. 4 is a transverse section on line A B of Fig. 3 looking downward. Figs. 5 and 6 are enlarged sectional views at right angles to each other of the slide and locking device. Fig. 7 is a detail view of the key. Fig. 8 is a view of a bicycle with the support attached thereto in folded position. Fig. 9 is a similar view of a bicycle with the support extended.

*a* designates a tubular casing which is hinged at one end on a rod *n*, which is supported by two collars 6 and 7, attached to the two adjoining members of the bicycle-frame above the pedal-shaft in such position that when the case is turned up in folded position, as indicated in Fig. 8, it will lie parallel with the lower forward member of the frame, and when the casing is turned down in position to unfold the support the tube will be vertical, as indicated in Fig. 9. Within this casing is a tubular slide *d*, which is kept from rotating by means of a pin *c* engaging a slot *b* in the casing. To the lower end of this slide is fixed a block *o*, provided with three equidistant slots, within which are pivoted the upper ends of the supporting-legs *k* of the tripod, which are adapted to project through slots *i* in a head *g*, attached to and closing the free end of the casing, as indicated in Figs. 1 to 4. The slots are so arranged that when the slide is lifted, as in Fig. 1, the supporting-legs will be collapsed within the casing. When the slide is depressed, as indicated in Fig. 3, the supporting-legs will be extended in tripod form, so as to support the machine, as indicated in Fig. 9.

Extending transversely across the slide above the block *o* is a bolt *t*, which is guided in slotted enlargements *r* and *q* in the opposite walls of the slide, and a spring *u* is interposed between the head *t* of the bolt and the enlargement *q*, which will throw the bolt outward into engagement with the notch *l* in the lower end of the tube when the slide is depressed to extend the legs *k*, as indicated in Fig. 3. When the bolt is projected, it will be locked by means of an arm *w* on a sleeve *y*, which is fastened to a shaft, journaled in the wall of the slide *d* at right angles to the bolt, as indicated in Figs. 5 and 6, the tooth of this arm engaging a slot *v* in the head of the bolt (see Fig. 6) and locking the same. The outer end of the shaft is preferably square and is contained within the countersink *l* in the wall of the slot just above the pin *c*, and this end of the shaft may be engaged by a key *e*, Fig. 7, the end of which may be inserted through the slot *b* and engaged with the shaft, whereby the latter can be rocked and arm *w* disengage bolt *t* from notch *l* and allow the slide to be raised within the tube, thus closing the supporting-legs therein, as indicated in Fig. 1. The bolt *t* will be held retracted by contact with the inner wall of casing *a*, except when it is in the lowest position, when spring *u* will cause it to engage the notch *l*. The engagement of bolt *t* with this notch occurs automatically when the legs are extended and the slide is in its lowest position, and it is therefore obvious that the support will remain extended, as indicated in Fig. 9, until the key *e* is inserted and the bolt disengaged from the casing, and the rider by removing this key when he leaves his machine will leave the tripod extended, so that the machine cannot be moved except by being carried bodily. After the supporting-legs of the tripod are telescoped into the casing by raising the slide, as above stated, the casing is turned upward and into the position indicated in Fig. 8, and it may then be retained in such position by means of the adjustable collar or cap 13, which is slidably mounted on the rod 10, attached by clips 11 and 12 to the lower bar of the frame, so that this cap can be slid toward or over the casing, and when it is slid downward it will cover the end of the casing and prevent both the entrance of dust therein and dropping out of position.

What I claim as new is—

1. The combination of the casing, the slide therein, and the bolt for automatically locking said slide in its lowered position, the legs pivoted to said slide and the slotted guide-plate in the end of the casing whereby said leg is caused to be extended when the slide is lowered, for the purpose and substantially as described.

2. The combination of the casing, the tubular slide therein, the bolt carried by said slide, the rock-shaft and arm for releasing said bolt when the shaft is rocked, the legs pivoted to said slide and the plate attached to the end of the casing and provided with guide-slots through which the legs project and whereby they are caused to be extended when the slide is lowered, for the purpose and substantially as described.

3. The combination of a bicycle-frame, the rod journaled thereon, the casing connected to said rod and adapted to be swung parallel with one member of the frame when turned upward, and into a vertical position when turned downward, the slide in said casing, the tripod-legs attached to said slide, the slotted guide-plate in the free end of said casing through which the legs project, whereby the legs are extended when the slide is lowered.

4. The combination of a bicycle-frame, the rod journaled thereon, the casing connected to said rod and adapted to be swung parallel with one member of the frame when turned upward, the slide in said casing, the tripod-legs attached to said slide, the slotted guide-plate in the free end of said casing through which the legs project, whereby the legs are extended when the slide is lowered; with the bolt in said slot adapted to engage a recess in the free end of the casing and automatically lock the slide with the legs in extended position, the rock-shaft at right angles to the bolt adapted to be operated by a key, and an arm on said shaft engaging the bolt and adapted to release the same when said shaft is properly rocked, all substantially as and for the purpose described.

In witness whereof I subscribe my signature in presence of two witnesses.

HEINRICH ROSSKOPF.

Witnesses:
 WOLDEMAR HAUPT,
 HENRY HASPER.